(12) United States Patent
Bolin

(10) Patent No.: US 8,270,940 B2
(45) Date of Patent: *Sep. 18, 2012

(54) EMERGENCY CALL SYSTEM USING SPECIFIC MOBILE USER INFORMATION

(75) Inventor: Johan Bolin, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/342,336

(22) Filed: Jan. 3, 2012

(65) Prior Publication Data

US 2012/0100827 A1    Apr. 26, 2012

Related U.S. Application Data

(63) Continuation of application No. 12/374,206, filed as application No. PCT/SE2006/050271 on Jul. 21, 2006, now Pat. No. 8,112,061.

(51) Int. Cl.
*H04M 11/04* (2006.01)

(52) U.S. Cl. .............. 455/404.2; 455/403; 455/404.1; 455/414.1; 455/457; 340/426.16

(58) Field of Classification Search .............. 455/404.2
See application file for complete search history.

(56) References Cited

U.S. PATENT DOCUMENTS

| | | | |
|---|---|---|---|
| 6,493,629 B1 | 12/2002 | Van Bosch | |
| 6,577,946 B2 | 6/2003 | Myr | |
| 6,741,841 B1 | 5/2004 | Mitchell | |
| 2002/0143930 A1* | 10/2002 | Babu et al. | 709/224 |
| 2003/0098784 A1 | 5/2003 | Van Bosch et al. | |
| 2004/0142678 A1 | 7/2004 | Krasner | |
| 2005/0016787 A1 | 1/2005 | Lesesky et al. | |
| 2005/0030224 A1 | 2/2005 | Koch | |
| 2005/0055417 A1 | 3/2005 | Reich et al. | |
| 2005/0222754 A1 | 10/2005 | Meisler et al. | |
| 2006/0128301 A1 | 6/2006 | Dorfstatter et al. | |
| 2008/0054072 A1 | 3/2008 | Katragadda et al. | |

FOREIGN PATENT DOCUMENTS

| | | |
|---|---|---|
| WO | WO 2005/032202 A1 | 4/2005 |
| WO | WO 2005/039214 A1 | 4/2005 |
| WO | WO 2006/009497 A1 | 1/2006 |
| WO | WO 2006/033607 A2 | 3/2006 |

OTHER PUBLICATIONS

International Search Report, PCT Application No. PCT/SE2006/050271, May 3, 2007.

* cited by examiner

*Primary Examiner* — Charles Appiah
*Assistant Examiner* — Mazda Sabouri
(74) *Attorney, Agent, or Firm* — Myers Bigel Sibley & Sajovec, P.A.

(57) ABSTRACT

The present invention presents a method for creating a relation between mobiles and a vehicle of a wireless communications network. The vehicle is equipped with an on-board device with wireless communication capability. The present invention also presents an on-board device and a road user server to be used in such wireless communications network. Mobiles in the vehicle are triggered to report their location to the network. When the vehicle reports its location an association between the vehicle and the mobiles having same location information is performed. The triggering signal is sent on control channels triggering all mobiles, including mobiles in idle mode. Profiles of mobile users in a vehicle, based on location information and mobile identities, are retrieved and stored in lists which are forwarded to fore example hospitals and fire departments when an accident occurs.

16 Claims, 5 Drawing Sheets

EMERGENCY CALL SYSTEM USING SPECIFIC MOBILE USER INFORMATION

TECHNICAL FIELD

The present invention relates in general to a wireless communications system and more particularly to a method for creating a relation between mobiles and a vehicle in such a system.

BACKGROUND

There are several occasions where locating unknown mobile phones in idle mode are of very high interest. One particular example is in emergencies and accidents where the locations of mobile phones in an accident area are of interest of two main reasons: the first is to get an approximate understanding of how many persons that are involved in the accident; the second is to learn who they are. Even if one can not be sure that the person registered on a mobile phone subscription is the one currently wearing it, most likely it is so, and especially people with special health conditions who has been encouraged to wear their phones, will likely keep track of there mobiles. A problem with finding mobile phones in idle mode is however that common positioning procedure requires the phone number of the mobile to position to be known.

Location based services has become a well known concept. In addition to the commercial services, the governments in several countries have also put requirements on the network operators to be able to determine the position of an emergency call. For instance, the governmental requirements in USA (FCC E911) require that it must be possible to determine the position of a certain percentage of all emergency calls.

A general problem with most prior art emergency call systems is that positioning in general requires extensive control signalling. Such control signalling requires relative large efforts from a system, occupying communication and computational resources. Global Positioning System (GPS) is a technique often used for determining a location of airplanes, boats, busses mobiles etc. There are also some existing systems using GPS implemented in mobiles or vehicles for locating the mobiles or the vehicles upon an emergency call. Also other techniques requiring additional device equipments are known. Solutions for decreasing signalling and simplifying the positioning procedure have therefore recently been developed and are described below.

There are some solutions relating to on-board telemetric components for heavy vehicles (busses and trucks) but non of them addresses a solution containing equipment reporting information about passengers in the vehicle.

In the published patent application PCT/SE2004/001328, publication number WO2005/032202, there is described a method for estimating the position of mobile terminals with improved accuracy and limited investments in additional equipment. According to the method additional control signals comprising virtual base station identification data are distributed in the radio system from well defined locations. There is a connection between each virtual base station identification data and the location from where it is transmitted, and a mobile terminal can use the information for improving its position estimation according to conventional procedures. Since the virtual base station identification data is provided in the same format as normal base station identification data, no modifications at all of the mobile terminals are necessary. However, the mobile terminal is not able to connect to the communications system using a cell associated with the virtual base station identification data, since this data only is intended for position estimating purposes. In such a way, the devices for providing the additional information necessary for the improved position estimation can be made very simple and inexpensive.

Similar solutions are also described in patent applications PCT/SE2004/01345 with publication number WO2005/039214, and PCT/SE2005/001003 with publication number WO2006/009497.

In patent application PCT/SE2005/001257, publication number WO2006/033607, there is described a cellular communications network where text messages that are unique for a certain group of base stations, at each instant, are broadcast to mobile terminals. The mobile terminals include the text message or a text derived based on at least the text message as a part of a position dependent service request data packet. The data packet is sent to a service provider. The included text is interpreted, e.g. in the communications system or in the service provider, as a position or location associated with the base station group that broadcast the text message. The position dependent service is then provided based on the interpreted position or location.

In most cellular systems, it is possible to broadcast messages to all terminals within a cell. This is a message sent by the base station situated in the top of the present neighbour list. This message is typically broadcasted in a similar way as the control signals that are used by the terminals to tune in to a certain base station. However, this broadcast signal transmits a message, typically a text message (SMS) that all terminals in the cell can receive. It is in other words possible to send out information locally to the particular cell, or a number of cells if several cells send the same message, to all terminals in that cell.

WO2006/033607 presents a solution where the location of a mobile terminal can be determined to the accuracy of the cell a mobile phone is camping on. That is the area covered by the cell the mobile phone is attached to. The base station which the mobile phone is being attached to, can send a broadcast text message (e.g SMS-Broadcast) set by network control and messaging nodes in the network. By making this message unique to the radio cell, an application fetching this message can, by using a mapping table, translate the message to a geographical area. This can be done in the mobile phone, which can then be in idle mode since the broadcasted message is received also in idle mode. If the mapping is not done in the mobile phone, it can also be done in the network. In this case the mobile phone must send the received message to a mapping server in the network over the user plane, e.g. GPRS. The network then returns the geographical location.

Non of the above mentioned systems describes a common simple available solution for estimating the number of persons bound to an emergency call area and at the same procedure identifying who they are and locating them in a fast and low capacity requiring matter.

SUMMARY

An object of an embodiment of the present invention is to provide a solution for how to get indications of how many people are involved in an accident, and possibly also who they are, without the persons themselves doing anything actively.

An advantage of the present invention is to provide a simple solution which does not require additional equipments, that is fast to implement and that does not require large signalling efforts.

In another embodiment of the invention there is described a method for creating a relation between mobiles and a vehicle, determining a location of the vehicle and using the identification numbers of mobiles to retrieve passenger identification information.

Another embodiment of the present invention comprises an emergency reporting method for reporting vehicle accidents wherein the reports includes information about the passengers in the vehicle.

It is another object of an embodiment of the present invention to present a method for detecting mobiles in idle mode by sending messages using the existing control channels.

It is an object of an embodiment of the present invention to present a method for creating a relation between mobiles and a vehicle of a wireless communications network. The vehicle is equipped with an on-board device with wireless communication capability. According to the method, messages are broadcasted in the vehicle to all mobiles within the vehicle. The messages include vehicle identity information or information which can be used together with other information to get a unique identity of the vehicle. A signal triggering all mobiles in the vehicle to transmit location area update messages, and/or re-register to network messages, is sent to a network node. The mobiles sends first measurement reports to the network node, the reports including broadcasted messages or information based on the broadcasted messages. The on-board device sends second measurement reports from the on-board device to a road user server, the reports including information used to correlate the first measurement reports received from the network node with the vehicle.

It is another object of an embodiment of the present invention to present a device in a wireless communications network, wherein the device is intended to be used on-board a vehicle. The device is equipped with wireless communication capability used to access and communicate with the wireless communications network. A first transmitter, in the device, is used for broadcasting messages including vehicle identity information or information which can be used together with other information to get a unique identity of the vehicle. The messages sent in the vehicle are limited to reach within the vehicle only. A second transmitter, in the device, is used for sending signals to all mobiles within the vehicle triggering all mobiles to send location area update messages and/or re-register to network messages. The signals include the broadcasted information and are sent to a mobility management controller, e.g. serving mobile centre. The device also comprises a transceiver used to send measurement reports to a road user server. The reports include information to be used by the road user server in a correlating procedure performed for determining which mobiles are considered to be within the vehicle.

DETAILED DESCRIPTION

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
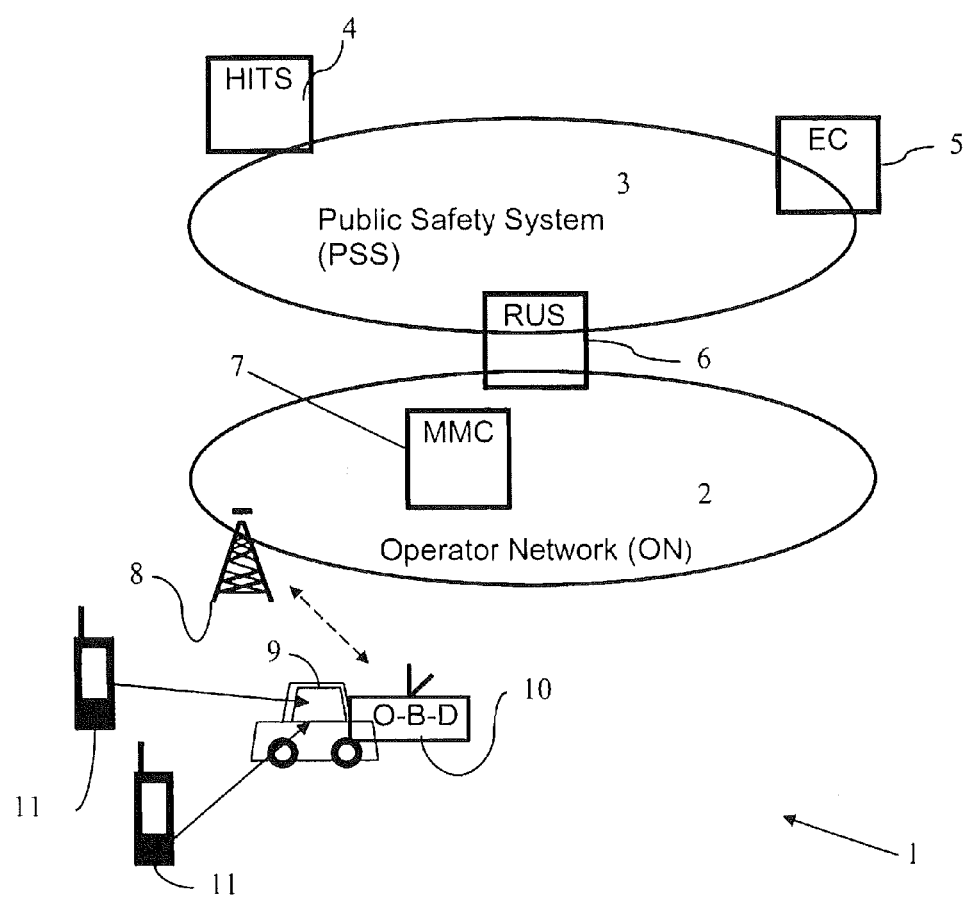
FIG. 1 is a block diagram illustrating an embodiment of the present invention.

FIG. 1 is a block diagram of an embodiment according to the invention illustrating a network and nodes for performing emergency calls and for associating mobiles with a vehicle location. The wireless communications network 1 (WCN) is disclosed including only the necessary nodes for understanding the invention and several nodes without critical or unique functionality for performing the present invention are not shown. Signalling between nodes in the WCN 1 is handled by intermediate nodes, gateways and sub-systems. The WCN 1 includes an operator network (ON) 2 connected to a public safety system (PSS) 3, via at least an intermediate node, which in this case is the Road User Server (RUS) 6. The RUS 6 is a single node or one or more distributed functions among nodes in the WCN 1. The RUS 6 is located in the operator network 2 and/or in the PSS 3, or distributed among the ON and the PSS. The RUS 6 is responsible for hosting information about the positions of a vehicle 9 and user devices 11, or information needed to determine the positions of the vehicle 9 and the user devices 11, when a look-up procedure is triggered. An Emergency Central 5 (EC) is included as part of the PSS 3. The Emergency Central 5 is responsible for coordinating dispatches etc. The PSS 3 is also connected to a hospital IT system (HITS) 4, which includes information like electronically journals, IT medicine capabilities, emergency vehicle location/capabilities etc. A Mobility Management Controller 7 (MMC), in the operator network 2, such as a Base Station Controller (BSC) or a Radio Network Controller (RNC), is constantly, intermittently, periodically and/or event triggered updated with user device 11 location. The MMC 7 receives information from the user devices 11 via one or more base stations 8. The vehicles 9 on-board device (O-B-D) 10 communicates using a WCN 1, e.g. a cellular network or a radio network. The RUS 6 is typically located in a domain connected to the internet, core network. The on-board device 10 populates the Road User Server 6 with information over a data session. Such information is person IDs, vehicle ID, sensor registrations, camera pictures etc. In case an emergency call is triggered, e.g, from the on-board device 10, the emergency call will then either include an A number, that is the identity of the on-board device used for fetching a list with persons in the vehicle, or the emergency call will include the same list. The list included in the emergency call is received by querying the RUS 6 identifying the vehicle 9, based on a registration number.

There are multiple ways in determining the number of persons in a vehicle involved in an accident. Following are two principles describe for when and how this is done:

1. A report is sent from the vehicle when an accident happens.
   A server in the network composes in advance a table of how many peoples, user devices, that are in the vehicle and, if possible, who they are. If an accident happens, an automatic emergency call refers to this table.
2. Reporting the number of persons and who they are, is done by an on-board device, e.g. on-board device. The O-B-D has collected information in advance about mobile users and how many mobile users are in the vehicle.
   Each person in the vehicle has a user device which reports that the holder of the device is located in the vehicle.

A central unit collects information of who are in the vehicle, and reports this when an accident happens.

There are also different alternative solutions of how to implement the different principles mentioned above. A few alternatives how to do pairing of person and vehicle is now presented:

Using the mobile phone and standard GSM signalling/positioning. When using GSM signalling the user device must be triggered to go from idle mode into dedicated mode and send a report to the network including information which can be used to associate the user device with a certain vehicle.

Using a short range radio (or other short distance communication bearer), e.g. Bluetooth and on board registering means. A short range radio solution requires that passengers must perform some form of reporting using this short range radio connection to a master unit for registering them selves or connecting to the network. The reporting is performed upon a triggering event, opening doors, turning on the vehicle etc. starting a register request procedure. Such a register request procedure is the on-board device sending an audio message for example a "register to local network"-message.

Using sensors in a vehicle for sensing the number of persons in the car. The sensors are placed in doors, seats, seatbelts etc. A sensor alternative does not require any additional devises except an on board device mounted in a car, but does instead require a number of sensors and will also make it more difficult to find out who are in a vehicle.

When an accident occurs, the on-board device in the vehicle will automatically perform an emergency call to an emergency centre reporting that there has been an accident and also send its location to the centre. Equipment necessary to do this will be installed in all new cars and all trucks and busses in Europe and likely in other markets as well.

According to an embodiment of the present invention there is provided means for locating a standard GSM/WCDMA phone without any special application or configuration, having an accuracy down to a couple of meters. This is far less than the area covered by a regular radio cell. Positioning of mobile phones is performed using control signals, and standard radio network control signalling and procedures, between the radio network and the mobile phones. This is further more a positioning using measurement of radio signals from multiple control signal transmitters.

According to an embodiment of the present invention a network is disclosed including an on-board device in a vehicle, a road user server, or traffic server system, managing the information, including other traffic related information, and an emergency centre. Such traffic related information is current situation of traffic jam, bad weather, construction work etc. There is also a network connection between the on-board device and the traffic server. This network is a wide area coverage network typically a cellular network.

An object of the present invention is to enhance message and/or information sent or presented to an emergency centre with information relating to the number of persons that are involved in an accident, and if possibly who they are. Reporting the number of persons that are estimated to be in the vehicle is done either in advance at a report triggering event, e.g. when starting the vehicle, opening a door etc, or when an accident triggered sensor is activated. The reporting can also include information received from sensors in seat belts, seats, doors, cameras etc.

Using Cellular Network and passengers/drivers mobile (GSM/UMTS) devises:

If a passengers and/or a driver of a vehicle have a mobile device each, e.g. user devices or mobile phones with GSM or UMTS capabilities, these devices is used to get an understanding of how many passengers are in the vehicle and also who they are. Identifying who the passengers are is a matching procedure where mobile identification numbers are matched with user profiles. Mobile devices send reports to the network constantly in order for the network to have a decent understanding where the phones are. Thereby the network is able to page a mobile device when the mobile device has an incoming call. Such a reporting procedure, update signalling and location based on events, is initiated by for example a user when he or she makes or receives a phone call. Other activities causing update signalling are data transmission from/to mobiles or a triggering event making an idle mobile report where the mobile is. This triggering event, making an idle mobile report where it is, may be either getting into a new location area, finding a network after suffered from no coverage or by time scheduled updates.

A way to make the mobile device report that it is located in a vehicle, possibly also in an accident/emergency situation with the vehicle, is to emulate one of those events mentioned above. Considering that the mobile device is using the GSM or UMTS network and without involving the holder of the device or putting requirements on any specific software or hardware.

Two of these events mentioned above are triggered, for example by a transmitter sending control signals on a control channel. These two events are the new location area event and re-registration in the network event.

To emulate new location area event, the transmitter will, with low power, transmit a control signal in the same way as ordinary base stations. For GSM this would be a BCCH with a BSIC and with a location area number different from the location area of the cell the mobiles currently are camping in. Typically the location area should be unique and only used as 'in-vehicle' location area and possibly, depending on implementation, also uniquely used for emergencies. In another embodiment of the present invention the unique number is the vehicle registration number.

To emulate re-register in network, the transmitter shall interfere with the radio network, either by interfering all GSM/UMTS frequencies, or by interfering one-by-one the different operator's spectrum. The interference should be transmitted during a time interval as short as possible, though long enough for the mobiles to lose the network connection so that the mobiles will try to re-connect.

The association between the passenger/driver and the vehicle, is done by letting the transmitter transmit a signal that later is associated, as will be described in specific further below, with the vehicle in the network.

The invocation of the transmitter to trigger each mobile phone to register that it is in the car. If the new location area trigger is used, a pre-condition is that each operator has a channel, the BCCH in GSM, which is transmitting on in the BCCH Allocation List (BA list) sent to the mobile phone to measure on. The BA list is a list of frequencies supported on neighbouring cells. This list is broadcast on the BCCH (Broadcast Control Channel) giving mobiles frequencies of the BCCH carriers on neighbouring cells. The BA list is typically used by the MS (Mobile Station) in the cell selection and re-selection processes.

Figure 2:
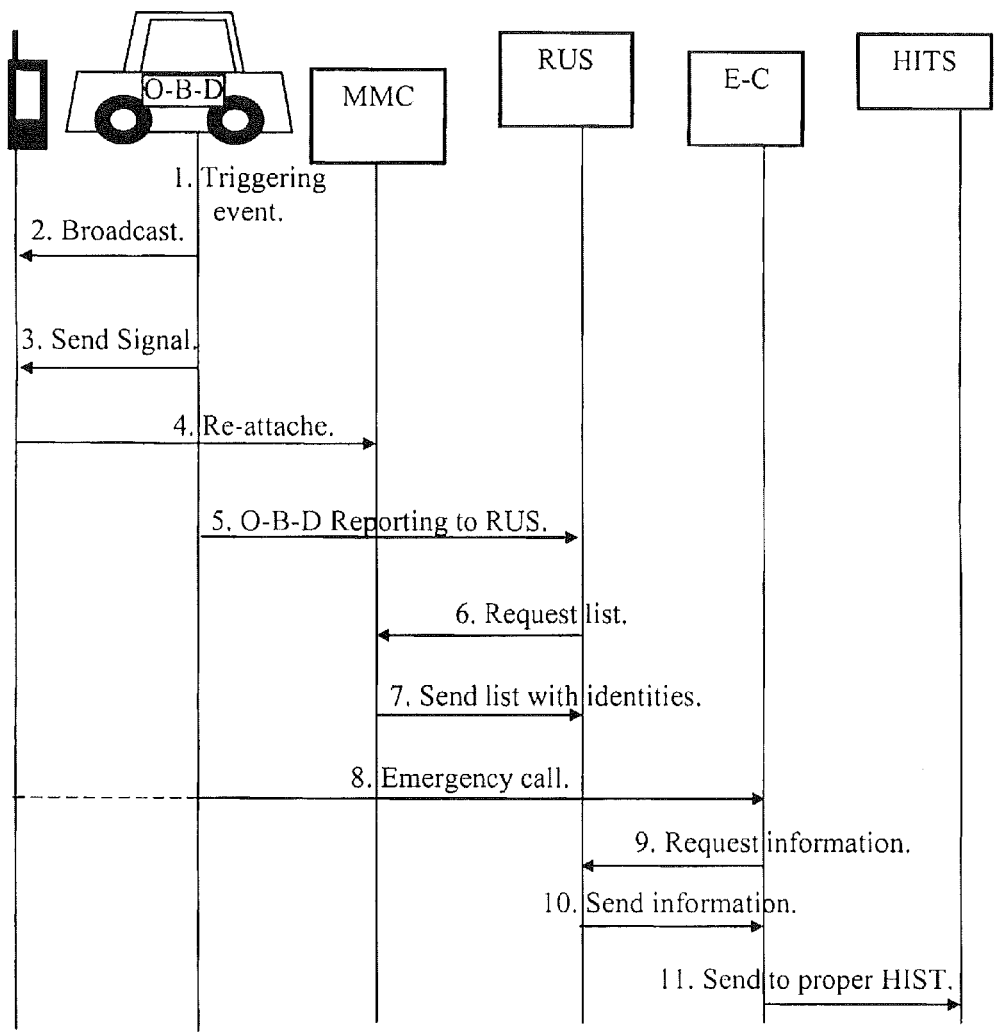
FIG. 2 is a signal diagram illustrating embodiments of the present invention.

FIG. 2 is a signal diagram illustrating embodiments of the present invention. According to the figure:

1) A correlating procedure is initiated by a triggering event, e.g. a sensor detecting collision, starting an engine, reaching a certain speed, time frequent, door opening sensing sensor, pressure sensors in seat belts being activated etc.
2) An on-board device (O-B-D) is turned on and starts broadcasting messages in the vehicle, the messages are bound to the area of the vehicle. This is achieved by broadcasting the messages with low power creating a micro cell in a macro cell, wherein the micro cell is the vehicle. The messages are sent on a control channel and including a special location area identity, at least different from the one camping on, which is typically the macro cell area. The messages sent will be used as a marker in a neighbour report sent to a network controller, a Base station controller (BSC) or a radio network controller (RNC). In GSM the control channel is a Broadcast Control Channel (BCCH).
3) The O-B-D starts sending signals which either interfere parts of or a whole frequency spectrum, or the signals are transmitted as control signals, on a control channel, with low power.
4) User devices will now either when the interfering signal is turned off, or as soon as user devices detects control signals, send a message to the network when re-attaching to the network. In GSM the messages are sent to the BSC.

The network controller detects that there is a special location area identity, e.g. BCCH/BSIC, in neighbour report(s) of user device(s) just registering. The special location area identity is then reported together with identifications of the user devices to a road user server (RUS). User devices are identified by their identity numbers, e.g. SIM, USIM, MSIN, MSISDN etc.

5) The O-B-D reports to the RUS that a triggering event was activated, the reports including information used at the MMC to correlate the user reports with the vehicle.
6) The RUS sends a message to the MMC requesting a list with information on mobiles with matching identities. The message includes information, like the specific local area identity, that is to be used in a matching procedure.
7) The MMC correlates the message received from the RUS with stored reports of user devices and sends a list of identities of user devices matching the information sent in the message in step 6.

In an embodiment of the present invention the reporting is performed as a pre-defined mechanism and therefore step 6 is not needed then.

The RUS processes the information received from the MMC and from O-B-D and composes lists of user identities, e.g. names, social security numbers, medical needs etc. Person profiles are pre-stored locally in a database or gathered from other distributed location in the network.

8) The O-B-D and/or a passenger using a user device, detecting a collision, make an emergency call to an emergency centre (E-C). The call includes information to be used to identify the vehicle or the user device.
9) The E-C sends a request to the RUS requesting a list of identities associated with the emergency call. This is a step to receive information on all passengers in the vehicle involved in an accident.
10) The RUS returns a list with identities of user devices that are in an identified vehicle.

In another embodiment of the present invention the vehicle registration number is used when reporting an accident. The vehicle is then located using GPS or other locating mechanism. Then an association between persons involved in an accident and the vehicle may be done by using a database mapping the emergency call information, the vehicle and user devices who have reported to be in the accident area.

11) The E-C receives the list and sends information to proper hospital IT systems, proper emergency vehicles or to nearby fire departments etc.

Hospital pools and other information pools are used for identifying proper HITS, emergency vehicles etc. The pools are preferably real time updated.

In an embodiment of the invention the correlation procedure mentioned above in 1)-7) is pre-configured and is initiated by an event, such as the engine of the vehicle turned on, the vehicle starts moving or at pre-defined time intervals.

In another embodiment of the present invention the correlation procedure mentioned above in steps 1)-7) is performed after a collision is detected.

In yet another embodiment of the present invention the O-B-D includes either a transmitter turned on and transmitting a BCCH, witch could be a BCCH with a special location area identity or different form the one in the surrounding outdoor area, or a transmitter that is always on. The transmitter keeps transmitting a BCCH as long as the vehicle is moving, possibly also a certain time after that the vehicle stops.

In another embodiment of the present invention local reporting to the on-board device is performed. The on-board device first gather information of how many there are in the vehicle and possibly also identifying who the persons are. Then the gathered information is sent as a list to the TUS. There are a few alternatives how to do a gathering of information. It can be performed using sensors in the car or using passenger's user devices. Communication with user devices when collecting information is typically performed using a wireless interface, such as Wireless LAN, Bluetooth, or infra red light (IR). Possible access networks are GSM, UMTS, CDMA2000 etc.

Additionally, sensors and/or cameras are used for gathering additional information. The sensors are used for detecting how many passengers are in the vehicle, e.g. sensors in seat belts, seats, doors etc. Possibly combining sensors with other identification mechanism to find out who the persons in the vehicle are, for example using identification mechanisms like fingerprints, portable USB-memories, identification cards etc. The cameras are used for taking snapshots at a collision moment and/or at different times, after a triggering event starting the correlation procedure. The pictures are analysed and/or stored in the on-board device. Snapshots and/or sensor information are sent as additional information to the emergency centre.

In another embodiment of the present invention the O-B-D reports gathered information to the RUS either when doing the emergency call or as part of a reporting procedure not triggered by at a time of the accident.

Figure 3:
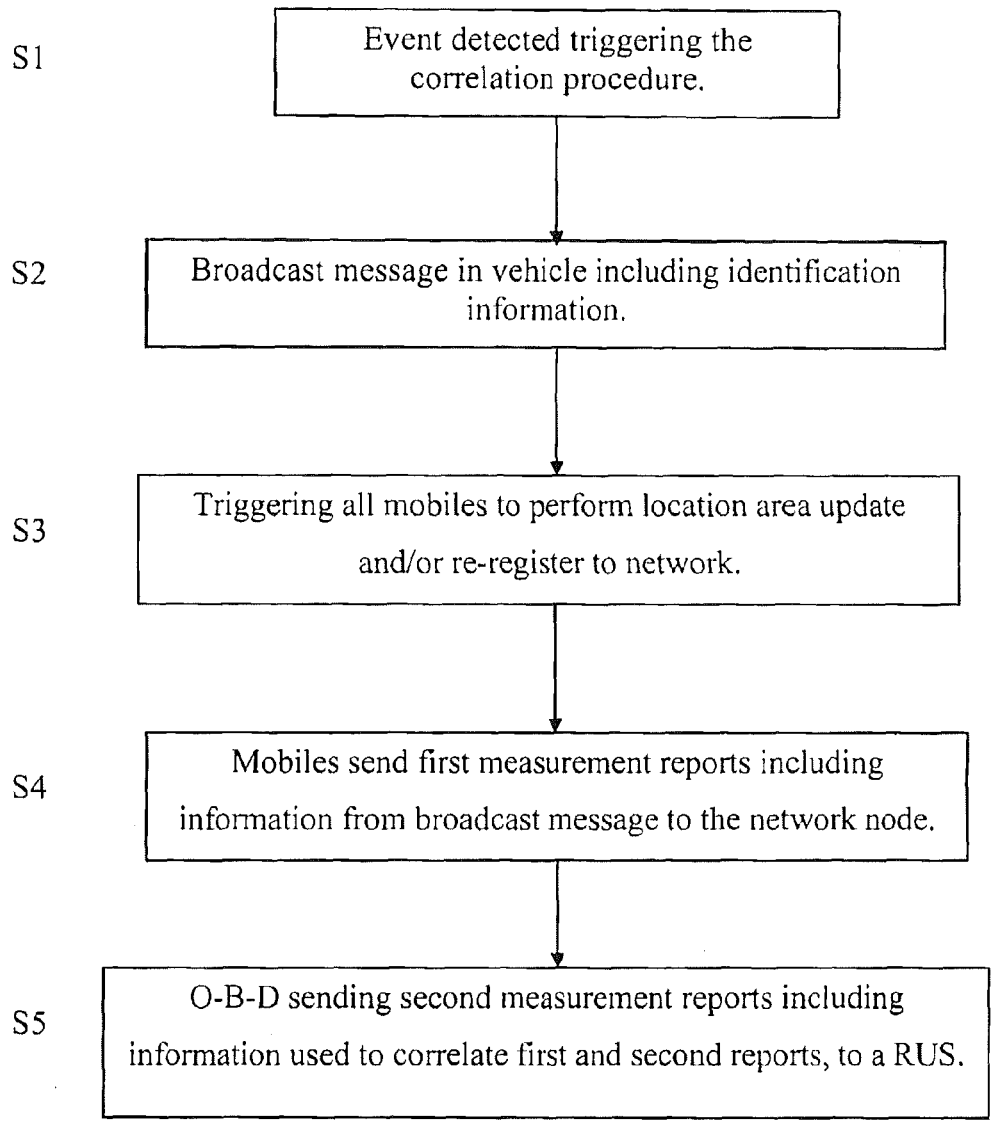
FIG. 3 is a flowchart according to an embodiment of the present invention illustrating the information correlation method.

FIG. 3 is a flowchart of an embodiment according to the present invention illustrating the information correlation method for creating a relation between mobiles and a vehicle. Upon detecting a triggering event a transmitter in the O-B-D starts broadcasting messages wirelessly in the vehicle, the messages restricted to reach only in the vehicle. The messages include vehicle identity information or information which can be used together with other information to get a unique identity of the vehicle. The triggering event is for example a driver opening the door, starting the engine, triggering an emergency call etc. A second signal is then sent triggering all mobiles in the vehicle to transmit location transmit location area update messages, and/or re-register to network messages, to a network node. The triggering signal is an interference signal interfering parts or the whole spectrum, or a signal with low power. Both broadcasted signal and triggered signal are sent on control channel. At step 4 the mobiles sends reports to the network node, the reports including broadcasted messages or information based on the broadcast messages. The O-B-D also sends reports to a RUS, the reports including identity information that is to be used to correlate the reports from the mobiles received from the network node with the vehicle. The RUS then performs a matching procedure to make a list of matching person profiles that are in the vehicle area. The profiles are stored internally in a database or distributed in the network.

Figure 4:
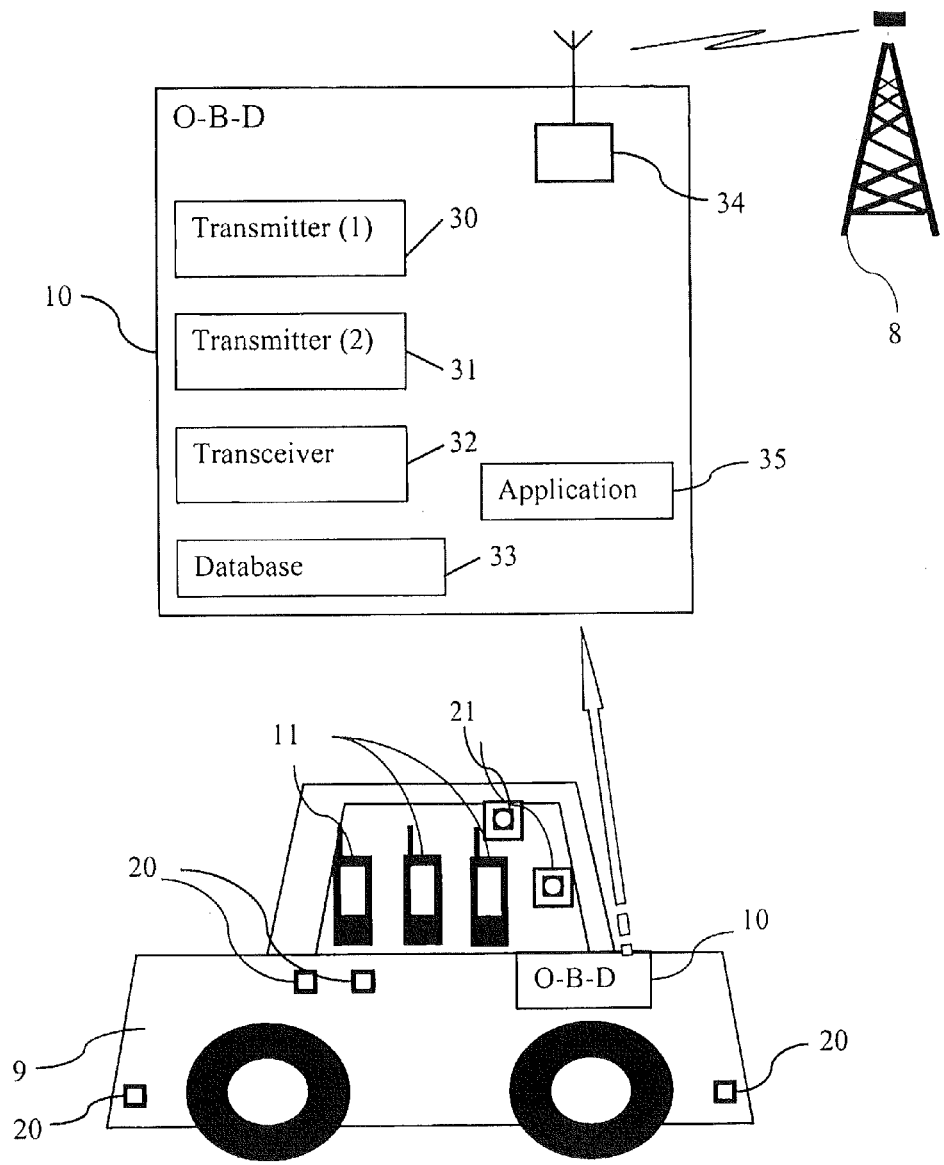
FIG. 4 is a block diagram illustrating an on-board device in accordance to an embodiment of the present invention.

FIG. 4 is a block diagram illustrating an on-board device with wireless communication capabilities in an embodiment according to the present invention. The O-B-D 10 includes a first transmitter 30 broadcasting low power messages on an existing control channel, The messages include vehicle 9 identity information or information which can be used together with other information to get a unique identity of the vehicle 9. The messages are transmitted using wireless equipment 34 and are limited to be sent within the vehicle 9. A second transmitter 31 is used in the O-B-D 10 to send signals to all mobiles 11 within the vehicle 9. The signals are intended to interfere with parts of or the whole spectrum and thereby trigger all mobiles to send location area update messages and/or re-register to network messages. The re-attaching/re-registering messages include broadcasted information and are sent to a MMC 7, such as a BSC or an RNC, via a base station 8. The O-B-D 10 also includes a Transceiver 32 used to receive reports from for example sensors 20 and/or cameras 21 and to send the reports to the RUS 6 as additional information. The transceiver 32 is also used to make/send emergency calls when receiving information from a collision detection sensor 20 or when triggered by a passenger. Reports and other user information as personal profiles, fingerprints of passengers etc. are stored in a database 33. The O-B-D 10 might send the profiles at collision detection or dynamically when updated. User profiles might as well be sent to the RUS 6 upon registration when purchasing a mobile or filled in using a web interface.

In another embodiment of the present invention the transceiver 32, in the O-B-D 10, is controlled by an application 35. The application 35 controls the transceiver 32 to send a request including identity information to the RUS 6. The RUS 6 returns a list with person identities/person profiles. The list is compared with stored information received from sensors 20 and/or cameras 21, and stored in the O-B-D database 33. After check the O-B-D 10 sends a complete report along with the emergency call to the emergency centre 5.

Alternatively, passenger's user devices with short range wireless communication capabilities are used for gathering information about the persons in the vehicle. This typically, but not necessary, requires that user devices has a software doing reporting when requested by the on-board device. Reporting is, as a further alternative, based on usual device discovery signalling which sometimes is initiated automatically when a device discovers a network.

Figure 5:
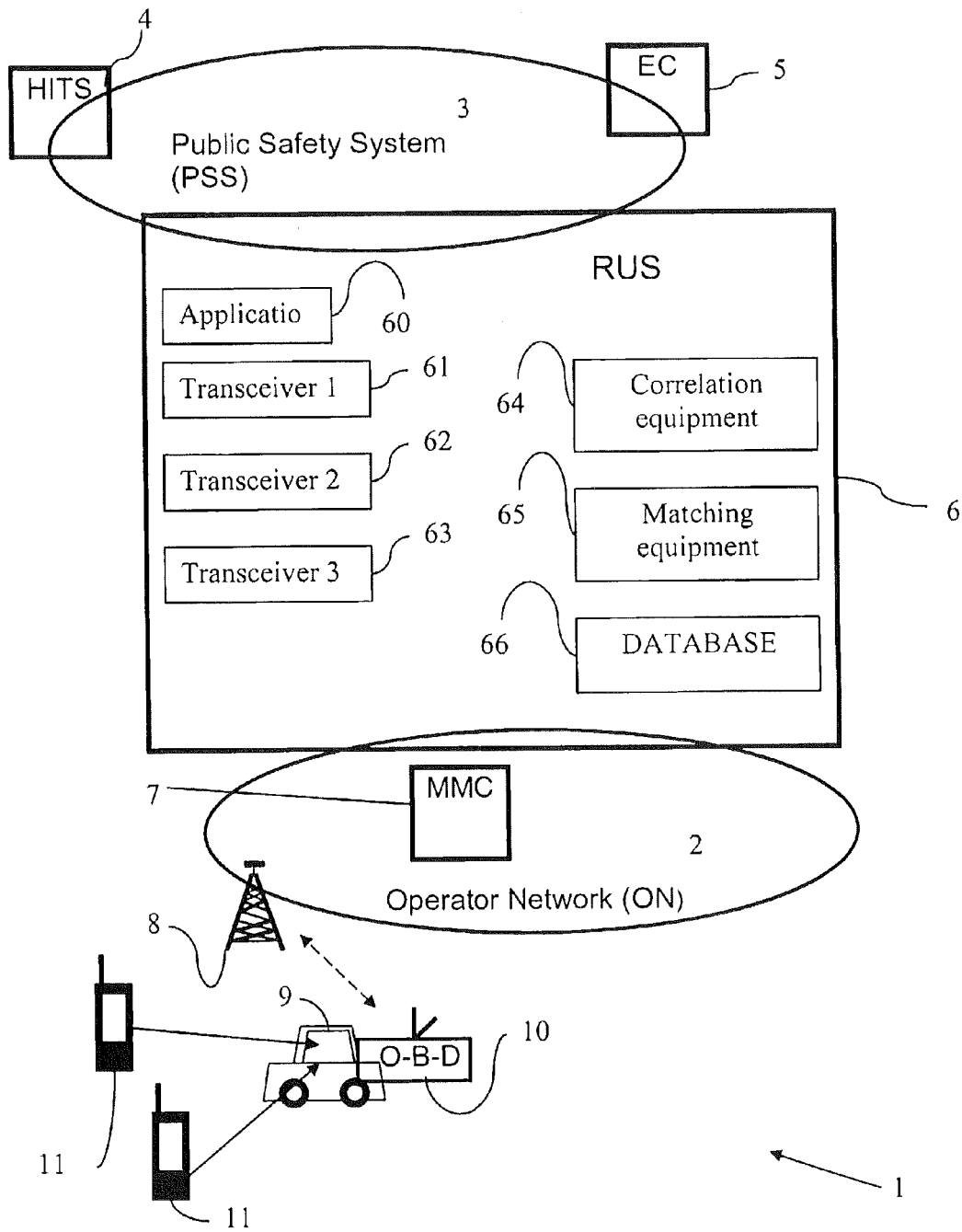
FIG. 5 is a block diagram illustrating a server according to an embodiment of the present invention.

FIG. 5 is a block diagram illustrating a road user server in an embodiment according to the present invention. The server 6 including an application 60 that is activated to perform a correlation procedure for creating a relation between mobiles and a vehicle of a wireless communications network. The server further comprises a first transceiver 61 that is used for receiving and/or sending reports to an on-board device 10 in a vehicle 9. Vehicle identity information or information which can be used together with other information to get a unique identity of the vehicle is included in the reports exchanged between the server 6 and the O-B-D 10. A second transceiver 62 is used for exchanging information with a mobility management controller 7. Correlation equipment 64 in the server is used for correlating information received from the MMC 7 and the O-B-D 10 to relate which mobiles 11 (user devices) are considered to be in a certain vehicle 9. The server 6 also includes matching equipment 65 for performing a matching procedure to relate mobile identity numbers to person identities and/or person profiles. A database in the server 6 stores lists of person identities and/or person profiles along with vehicle identities information. A third transceiver 63, in the server 6, exchanges lists with an emergency centre 5 upon request.

It will be obvious that the invention may be varied in a plurality of ways. Such variations are not to be regarded as a departure from the scope of the invention. All such modifications as would be obvious to one skilled in the art are intended to be included within the scope of the appended claims.

What is claimed is:

1. Method for creating a relation between mobiles and a vehicle of a wireless communications network, the vehicle is equipped with an on-board device with wireless communication capability, the method comprising:
    broadcasting messages in the vehicle, to all mobiles within the vehicle, including vehicle identity information or information which can be used together with other information to get a unique identity of the vehicle;
    sending a signal triggering all mobiles in the vehicle to transmit at least one of location area update messages, or re-register to network messages, to a network node;
    sending first measurement reports from the mobiles to the network node, the reports including broadcasted messages or information based on the broadcast messages; and
    sending second measurement reports from the on-board device to a road user server, the second measurement reports including information used to correlate the first measurement reports received from the network node with the vehicle,
    where the road user server is responsible for performing:
        correlating information relating to which mobiles are considered to be in a certain vehicle, based on the first measurement reports from the mobiles and the second measurement reports from the on-board device;
        performing a matching procedure to relate mobile identity numbers to at least one of person identities or person profiles;
        storing a list that includes one or more of person identities or person profiles along with vehicle identity information; and
        forwarding the list to an emergency center upon request.

2. The method of claim 1, where the broadcasting messages is triggered by one or more of the following actions:
    a driver starting the vehicle,
    sensors detecting vehicle movement,
    activation of an emergency call,
    on-demand requests from the road user server,
    sensors detecting door opening,
    sensors detecting an action associated with a seat belt,
    activation of a time period counter, or
    handover detection between macro cells.

3. The method according to claim 1, where the sending second measurement reports from the on-board device is triggered by one or more of the following actions:
    a user making an emergency call,
    a collision detection sensor is activated, or
    a user activating an emergency procedure.

4. The method according claim 1, where the second measurement reports include additional information gathered from at least one of sensors in one or more of seats of the vehicle, doors, or seat belts, or information from cameras.

5. Method for creating a relation between mobiles and a vehicle of a wireless communications network, the vehicle is equipped with an on-board device with wireless communication capability, the method comprising:
   broadcasting messages in the vehicle, to all mobiles within the vehicle, including vehicle identity information or information which can be used together with other information to get a unique identity of the vehicle;
   sending a signal triggering all mobiles in the vehicle to transmit at least one of location area update messages, or re-register to network messages, to a network node;
   sending first measurement reports from the mobiles to the network node, the reports including broadcasted messages or information based on the broadcast messages; and
   sending second measurement reports from the on-board device to a road user server, the second measurement reports including information used to correlate the first measurement reports received from the network node with the vehicle,
   where the on-board device is capable of detecting an emergency situation and performing emergency calls, including vehicle identity information or information which can be used together with other information to get a unique identity of the vehicle, to an emergency center, and
   where the emergency center, upon receiving an emergency call, is responsible for performing the following:
      sending a request to the road-user server, the request including the vehicle identity information, or information which can be used together with other information to get a unique identity of the vehicle, to the road-user server for performing a matching procedure;
      receiving a response from the road-user server including a list that includes at least one of person identities or person profiles; and
      sending the retrieved person profiles to one or more of proper hospitals, fire departments, or emergency vehicles.

6. The method of claim 5, where the sending person profiles to proper destination includes identifying in a pool database one or more of:
   a capacity of each hospital, fire department, or emergency vehicle at the moment;
   location of hospitals, fire departments, or emergency vehicles in relation to the vehicle position in a macro cell; or
   hospitals offering treatments for persons with specific needs.

7. The method of claim 1 where the network node is a serving mobile centre, a mobility management controller, a radio access network, or a radio network controller.

8. The method of claim 1 where the triggering signal is adapted to perform one or more of the following:
   interfering an entire or parts of a frequency spectrum and by this way triggering all mobiles in the vehicle to perform at least one of location update or re-registration when re-attaching to the network, or
   transmitting control signals with low power, using existing control channels, triggering all mobiles to perform a new location area registration.

9. The method of claim 8 where the triggering of all mobiles in the vehicle is used to trigger mobiles in Idle Mode as well.

10. A device, intended to be used on-board a vehicle, where the device is equipped with wireless communication capability used to access and communicate with a wireless communications network, the device comprising:
    a first transmitter used for broadcasting messages to all mobiles within the vehicle, including vehicle identity information or information which can be used together with other information to get a unique identity of the vehicle;
    a second transmitter used to send signals to all mobiles within the vehicle triggering all of the mobiles to send at least one of location area update messages or re-register to network messages, including broadcasted information, to a mobility management controller;
    a transceiver used to send measurement reports to a road user server, the reports including information to be used by the road user server in a correlating procedure performed for determining all mobiles within the vehicle.

11. The device of claim 10, where the first transmitter is triggered by one or more of the following actions:
    a driver starting the vehicle,
    sensors detecting vehicle movement,
    activation of an emergency call,
    on-demand requests from the road user server,
    sensors detecting a door opening,
    sensors detecting an action relating to a seat belt,
    activation of a time period counter, or
    handover detection between macro cells.

12. The device of claim 10, where the transceiver is triggered to send measurement reports upon one or more of the following actions:
    a user making an emergency call,
    a collision detection sensor is activated, or
    a user activating an emergency procedure.

13. The device of claim 10, where the transceiver receives additional information from sensors in one or more of vehicle seats, doors, or seat belts or from cameras, the additional information is to be included in the measurement reports sent to the road user server.

14. The device of claim 10, where the device is capable of detecting an emergency situation and performing emergency calls, including vehicle identity information or information which can be used together with other information to get a unique identity of the vehicle, to an emergency center.

15. The device of claim 13, where the transceiver is run by an application controlling the transceiver to perform:
    sending a request to the road-user server, the request including the vehicle identity information, or information which can be used together with other information to get a unique identity of the vehicle, to the road-user server for performing a matching procedure;
    receiving a response from the road-user server including a list that includes at least one of person identities or person profiles;
    comparing the received list with stored additional information received from at least one of the sensors or the cameras; and
    sending all information to an emergency center.

16. A server in a wireless communications network, the server including an application run to perform a correlation procedure for creating a relation between mobiles and a vehicle of a wireless communications network, the server comprising:
    a first transceiver for receiving reports from an on-board device in the vehicle, the reports including a vehicle identity information or information which can be used together with other information to get a unique identity of the vehicle;

a second transceiver for exchanging information with a mobility management controller;

correlation equipment for correlating information received from the mobility management controller and the on-board device to relate which mobiles are considered to be in a certain vehicle;

matching equipment for performing a matching procedure to relate mobile identity numbers to person identities and/or person profiles;

a database for storing lists of at least one of person identities or person profiles along with vehicle identities information; and a third transceiver for communicating the lists to an emergency center upon request.

* * * * *